United States Patent [19]

Guthke et al.

[11] Patent Number: 5,243,138
[45] Date of Patent: Sep. 7, 1993

[54] DEVICE FOR SECURING A PLURALITY OF INDIVIDUAL ELECTRICAL CONDUCTORS IN A BUNDLE TO FORM A CABLE

[75] Inventors: Hans-Peter Guthke, Steinkirchen; Werner Piede, Jork; Uwe Soltow, Hamburg, all of Fed. Rep. of Germany

[73] Assignee: Deutsche Airbus GmbH, Hamburg, Fed. Rep. of Germany

[21] Appl. No.: 667,515

[22] Filed: Mar. 11, 1991

[30] Foreign Application Priority Data

Mar. 15, 1990 [DE] Fed. Rep. of Germany ........ 4008239

[51] Int. Cl.⁵ .......................... H02G 7/12; F16L 3/00
[52] U.S. Cl. ...................... 174/146; 174/99 R; 174/138 R; 174/156; 174/157; 248/49; 248/68.1; 248/69; 248/74.2
[58] Field of Search .......... 174/146, 156, 157, 128.2, 174/99 R, 111, 130, 138 R, 28; 248/68.1, 69, 74.2, 62, 65, 49; 24/129 R, 115 R, 339, 129 D, 336, 130

[56] References Cited

U.S. PATENT DOCUMENTS

| | | | |
|---|---|---|---|
| 3,522,963 | 8/1970 | Farnden | 292/254 |
| 4,100,367 | 7/1978 | Netzel | 174/111 X |
| 4,219,693 | 8/1980 | French | 174/135 |
| 4,715,571 | 12/1987 | Soltow et al. | |

FOREIGN PATENT DOCUMENTS 3445489 12/1984 Fed. Rep. of Germany .

Primary Examiner—Leo P. Picard
Assistant Examiner—Hyung S. Sough
Attorney, Agent, or Firm—W. G. Fasse

[57] ABSTRACT

A plurality of individual electrical conductors are held together in a bundle to form a power supply cable, for example, for installation in an aircraft. For this purpose a conductor securing device has a disk divided into two half disk sections interconnected by a snap-on connection. Each half disk section has outer elements for holding individual conductors and a bow-shaped shell located centrally inwardly so that two shells of two interconnected half disk sections hold at least one further electrical conductor between the shells. Each shell extends with a shell extension laterally and axially out of its half disk section and the shell extension has as a shoulder for axially retaining a strapping belt.

14 Claims, 2 Drawing Sheets

# DEVICE FOR SECURING A PLURALITY OF INDIVIDUAL ELECTRICAL CONDUCTORS IN A BUNDLE TO FORM A CABLE

FIELD OF THE INVENTION

The invention relates to a device for securing a plurality of individual electrical conductors in a bundle to form a cable, such as a power supply cable especially suitable for installation, for example, in an aircraft.

BACKGROUND INFORMATION

Devices of this type are used for securing electrical conductors within an aircraft to provide a power supply from an electrical generator to various equipment requiring electrical power for its operation. Such an electrical power supply cable is practically a three-phase current cable, whereby each of the three conductors normally comprises two individual conductors connected in parallel. The conductors are freely suspended for cooling purposes. As a result, such a power supply cable conventionally comprises six individual conductors which must be secured with the aid of securing devices inside the supporting structure of the cabin floor, inside the tail section of the aircraft, and also within the wings.

Some of the electrical conductors or cables to be secured comprise conductors of the type which are sensitive against electromagnetic interfering radiation and some of these conductors themselves emit interfering radiation. The above mentioned power supply cable emits such interfering radiation. Further, a so-called exciter cable which supplies the field energy to the electrical generator, and which supplies control signals to the electrical generator, also emits interfering radiation. Such an exciter cable comprises a supply conductor and a return-conductor for supplying d.c. current to the generator. The d.c. current itself may change frequently. All electrical conductors must be installed with due regard to the above described conditions. Thus, conductors that are compatible with one another, are assembled into a cable or bundle, whereby the individual conductors are arranged with different spacings from the power supply cable and/or from the exciter cable, depending on the sensitivity of the individual conductors to the interfering radiation emitted by the power supply cable and by the exciter cable. Due to these requirements and due to the limited space available in the cabin floor, in the tail-end of the aircraft, and in the wings, it is very difficult to satisfy the required distribution spacing between the individual conductors in the available space.

U.S. Pat. No. 4,715,571 (Soltow et al.), corresponding to German Patent Publication (DE-PS) 3,445,489, discloses a device for securing a plurality of electrical conductors or cables, for example, in an aircraft. The known device comprises a single piece disk made of elastically yielding synthetic material provided with radially outwardly open recesses. Each recess receives a conductor and is closeable by circumferential rim sections which elastically yield for the insertion of the conductor and then hold the conductor in place. The individual disks must then be supported by a carrier or the like. The known structure leaves room for improvement with regard to the better utilization of the available space along the route, for example, within the cabin floor where the cable bundles must be installed and properly spaced from one another.

OBJECTS OF THE INVENTION

In view of the foregoing it is the aim of the invention to achieve the following objects singly or in combination:

to construct a securing device of the type described above in such a way that the different types of conductors can be installed in a more space efficient manner while still assuring a sufficient spacing between conductors emitting interfering radiation and conductors requiring protection against such interfering radiation;

to construct the securing device so that it can be easily mounted or secured to the aircraft structure, for example, by a lashing belt or belt straps; and to make the securing device of a synthetic material which has sufficient elastic flexibility for the intended purpose.

SUMMARY OF THE INVENTION

The conductor or cable securing device is characterized according to the invention in that a disk is diametrically divided into two equal or mirror-symmetrical half disk sections which are interconnected by a snap-on connector and in that each disk section is provided near the center of the entire disk with a curved or bow-shaped shell arranged so that the two shells of the two sections can hold a conductor or several conductors therebetween in a substantially central position. Preferably, each shell has an extension with a free end that reaches axially out of an end face of the respective half disk section. Additionally, the free end of the respective shell extension is provided with a radially outwardly extending shoulder. Thus, a strapping belt is securely held against axial displacement by the shoulder when the strapping belt is secured to the shell extension.

This type of construction of the present securing device utilizes the available space for the electrical conductors and cables efficiently, especially in the vicinity of the power supply cable and in the vicinity of the exciter cable. In fact, by the defined positioning of the conductors relative to each other, the total space requirement is reduced.

BRIEF DESCRIPTION OF THE DRAWINGS

In order that the invention may be clearly understood, it will now be described by way of example, with reference to the accompanying drawings, wherein.

DETAILED DESCRIPTION OF PREFERRED EXAMPLE EMBODIMENTS AND OF THE BEST MODE OF THE INVENTION

Figure 1:
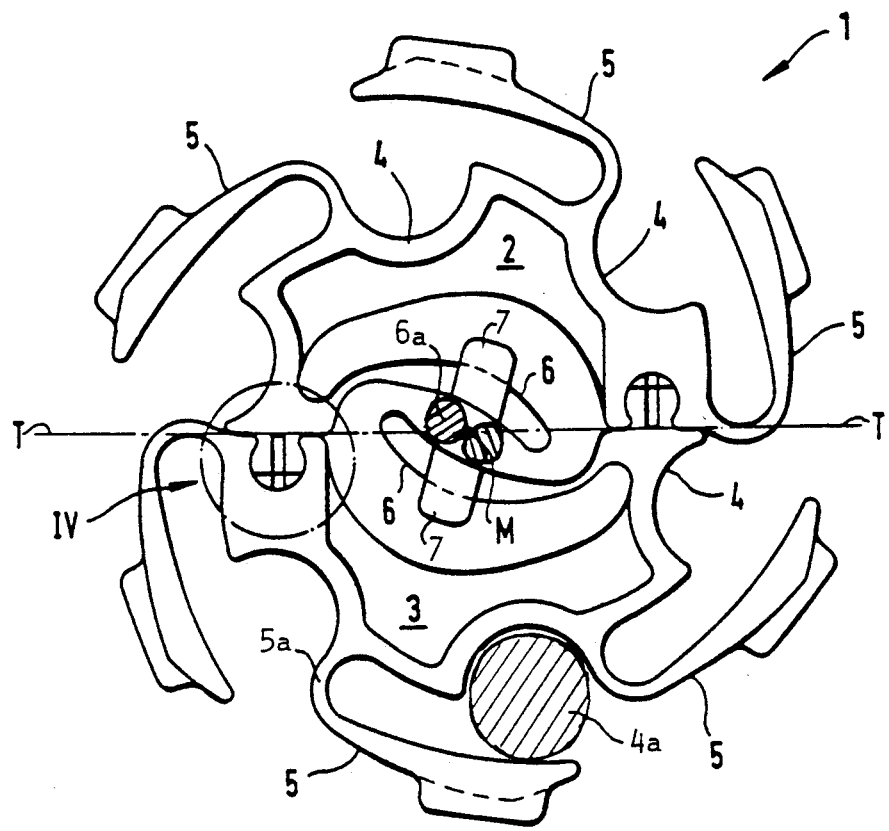
FIG. 1 is a side view of a securing device according to the invention, having two half disk sections divided along a dividing plane.

Referring to FIG. 1, the conductor or cable securing device 1 comprises two half disk sections 2 and 3 which are mirror-symmetrical to each other and divided along a dividing plane T—T which extends through the central axis M of symmetry of the entire device 1. Both half disk sections 2 and 3 have the same identical geometry. Each half disk section 2,3 has, e.g. three radially outwardly open recesses 4 and respective circumferentially extending radially inwardly elastically biased rim sections 5 to hold a conductor 4a in its respective recess 4. Each rim section 5 has a leaf spring type portion 5a which is so biased that it can be temporarily bent radially outwardly for the insertion of the respective conductor 4a, but which, when released, tends to hold the conductor in its recess with a radially inwardly directed biasing force The half disk sections 1 are made of synthetic material, preferably thermoplastic synthetic material.

Figure 3:
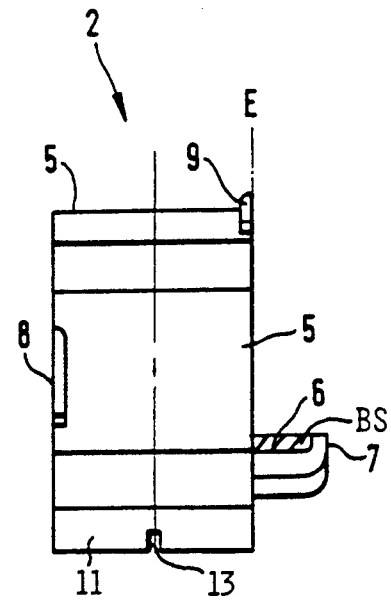
FIG. 3 is a side view in the direction of the arrow III in FIG. 2.

Each half disk section 2, 3 is equipped with a bow-shaped shell section 6 curving around the central axis M as best seen in FIG. 1. The two shell sections 6 cooperate with each, other in holding a conductor or conductors 6a when the two half disk sections 2 and 3 are connected to each other as shown in FIG. 1. Each shell section 6 has an axially extending extension as best seen in FIG. 3. The shell extension extends axially out of an end face E of the respective half disk section and the free end of the axially extending shell extension is equipped with a shoulder 7 reaching radially outwardly for holding a belt strap BS axially in place.

Figure 2:
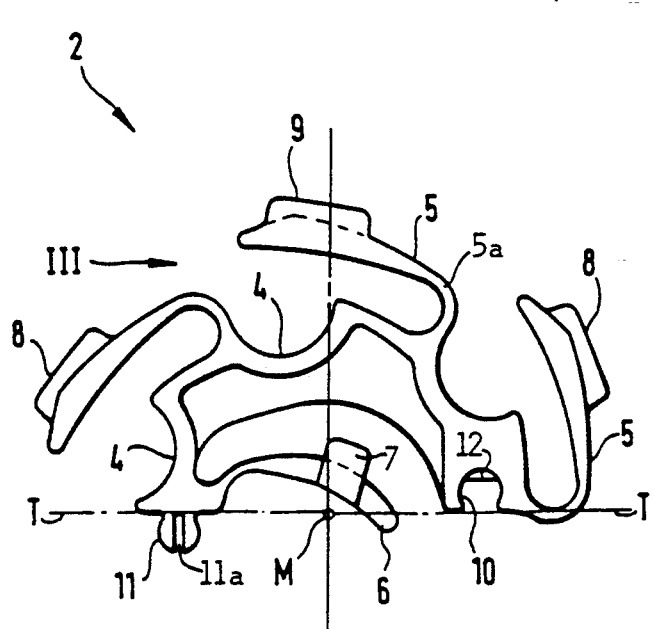
FIG. 2 shows one of the two half disks separated from the other disk of a pair of disks.
Figure 4:
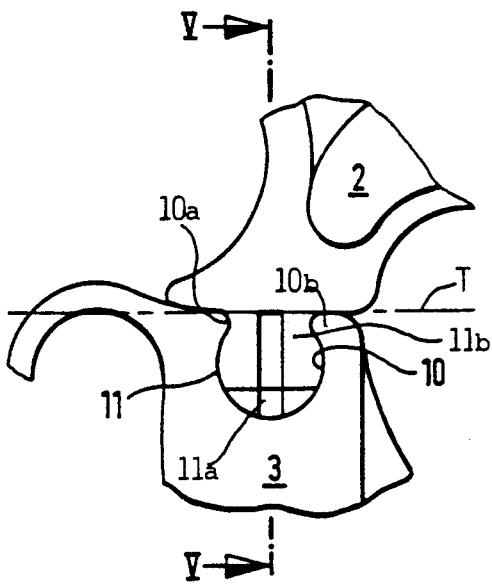
FIG. 4 is an enlarged view of a tongue and groove construction forming a snap-on connector shown in the encircled area IV in FIG. 1.
Figure 5:
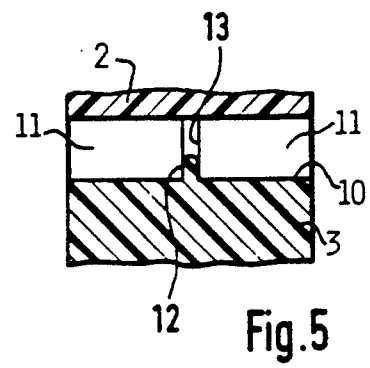
FIG. 5 is a sectional view along section line V—V in FIG. 4.

FIGS. 2 and 3 also show that each of the rim sections 5 is equipped with a radially outwardly extending ridge 8 or 9 located alongside one edge of the respective rim section as best seen in FIG. 3. The ridges 8, 9 may be gripped with a tool, for example pliers, to pull the respective rim section sufficiently radially outwardly to insert or release a respective conductor. FIGS. 4 and 5 illustrate one type of snap-on connector for securing the half disk sections 2 and 3 in a releasable manner to each other. For this purpose each half disk section 2 and 3 is equipped with a groove 10 and with a tongue 11 which are arranged with equal spacings relative to the central axis M and near the dividing plane T—T. The details of the snap-on connector tongue and groove constructions are best, seen in FIGS. 4 and 5. The groove 10 is provided with groove collars 10a, 10b along its groove inlet edges. Each collar 10a, 10b engages a respective neck section 11b of the tongue 11 to firmly hold the two half disk sections 2 and 3 to each other when the tongue 11 is inserted into the groove 10 as shown in FIG. 4. To facilitate the insertion, each tongue 11 is provided with a slot 11a so that initially the two tongue portions can be pressed toward each other for the insertion into the groove 10. When the insertion is completed, the two tongue sections again spring elastically outwardly to bear against the inner wall of the groove 10.

As shown in FIG. 5, each groove 10 is provided with a cross-tongue 12 engaging a cross-groove 13 in the tongue 11 to hold the two disk sections 2 and 3 relative to each other against axial displacement. When making the snap-on connection, one must make sure that the cross-tongue 12 properly engages the respective cross-groove 13.

The securing device according to the invention saves space because the electrical conductors 6a, namely the conductors that emit interfering radiation, can now be located centrally in the disk. For this purpose, the conductors are placed between the two shell sections 6 and then the two half disks sections 2 and 3 are snapped together as described. By locating two interfering radiation emitting conductors centrally in the device, the emitting radiation has been centralized, so to speak in a single conductor, whereby space is saved while still permitting a sufficient spacing between the conductor or conductors 6a on the one hand, and the conductors 4a on the other hand. The shell sections 6 also have an elastically radially inward bias to securely hold the conductors 6a in the center of the device.

After assembling the half disk sections 2 and 3 with the proper spacings from each other in the axial direction along the conductor 6a, the other conductors 4a are inserted, whereby the elastic rim sections 5 hold the conductors 4a in place as mentioned. The aircraft structure, for example, the floor construction of the cabin, is provided with carriers for the cable installation and the present devices are secured to these carriers, for example, by belt straps BS which extend around the axial extensions of the shell sections 6 and which are held in place in the axial direction by radially extending shoulders 7. Prior to tensioning the belt straps, the inwardly located exciter conductor or cable 6a is properly aligned while the respective device is already held in place by the belt strap. Thereafter, the individual conductors 6a are straightened out and then the belt straps are tightened to hold the so formed cable bundle in place. In this connection it should be mentioned that the ridges 8 and 9 of the disks 1 also serve the purpose of holding the devices against axial displacement after the belt straps BS have been tightened. Other conventional mounting means have been obviated by the belt strap mounting of the present securing devices.

Figure 6:
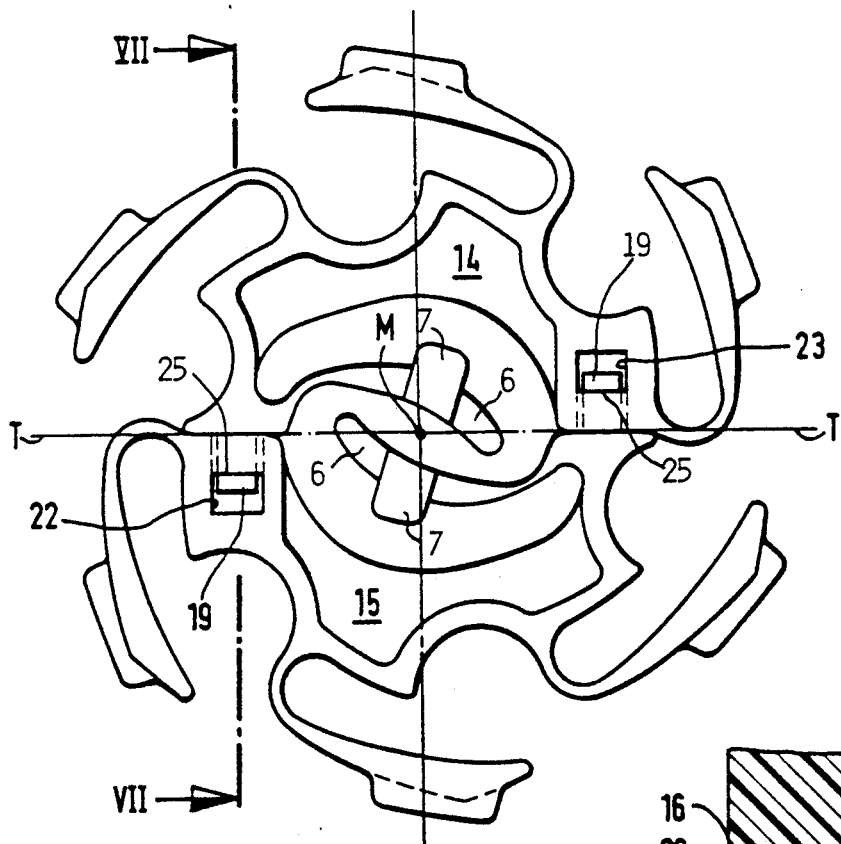
FIG. 6 is a view similar to that of FIG. 1, but showing a modified snap-on connection between the two half disk sections.
Figure 7:
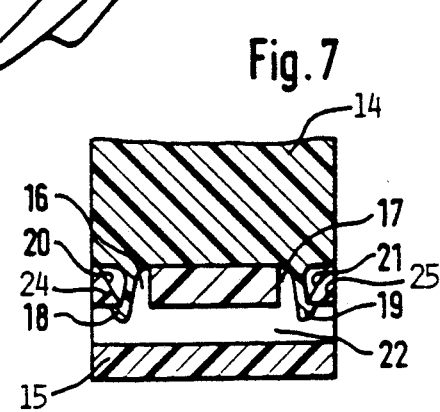
FIG. 7 is a sectional view along section line VII—VII in FIG. 6.

FIGS. 6 and 7 illustrate a modified snap-on connection for the two half disk sections 14 and 15 which otherwise are of the same constructions as in the embodiment shown in FIGS. 1, 2, and 3. The snap-on connections comprise in each half disk section 14 and 15 two openings or recesses 16, 17 and two hooks 18 and 19 having an elastic neck section. Each recess 16, 17 has a respective ramp wall 20, 21 ending in a locking shoulder 24, 25. The recesses 16 and 17 with their respective ramp 20, 21 and locking shoulder 24, 25 and the hooks 18, 19 are arranged with equal spacings relative to the center M and symmetrically, relative to the dividing plane T—T. Thus, when the two half disk sections 14 and 15 are snapped together, the hooks 18 and 19 can slide along the ramps 20, 21, thereby elastically yielding until the hook can engage the respective locking shoulder 24, 25 with an elastic bias.

In order to again release the two half disk sections 14, 15 from each other, an axially extending cross-channel 22, 23 passes through the respective disk section so that a tool may be inserted to push the heads of the hooks 18, 19 off the respective locking shoulder 24, 25.

Since the half disk sections have an identical, mirror-symmetrical geometry, another advantage is achieved in that the same mold can be used to make both half disk sections, for example, an injection mold. This advantage applies to both types of snap-on connectors described above.

Although the invention has been described with reference to specific example embodiments, it will be appreciated, that it is intended to cover all modifications and equivalents within the scope of the appended claims.

What we claim is:

1. A device for securing a plurality of individual electrical conductors in a bundle to form a cable, comprising a synthetic material disk divided into two half disk sections having a common central axis, each half disk section having radially outwardly open recesses for receiving one of said individual electrical conductors in a respective recess and circumferentially extending flexible rim sections (5) having a radially inwardly directed biasing force for holding a respective conductor in its recess, each half disk section further comprising snap-on connector means for securing said half disk sections to each other and a bow-shaped shell portion centrally located in each half disk section relative to said common central axis, said bow-shaped shell portions reaching inwardly from opposite directions so as to extend approximately in parallel to each other for holding at least one electrical conductor between both shell portions of said two half disk sections when said two half disk sections are interlocked by said snap-on connector means, each of said half disk sections further comprising an axially extending channel reaching to said snap-on connector means for inserting a tool into said channel to dislodge said snap-on connector means from each other when said half disk sections are to be disconnected from each other.

2. The device of claim 1, wherein each of said shell portions has an axial extension projecting laterally and axially outwardly from an end face of its respective half disk section, and wherein each of said extensions has a radially outwardly reaching shoulder (7) at its free end for holding a strapping belt.

3. The device of claim 1, wherein said snap-on connector means comprise at least one locking shoulder and at least one elastically bendable snap-on hook in each of said half disk sections, said locking shoulder and said snap-on hook being located with equal spacings from said central axis and next to a dividing plane between said two half sections so that the snap-on hook of one half disk section can engage the locking shoulder of the other half disk section and the vice versa to form a snap-on connection between said two half disk sections.

4. The device of claim 3, wherein each half section comprises a recess with two of said locking shoulders in each recess, and two elastically bendable snap-on hooks arranged for engaging the respective locking shoulders to form said snap-on connection.

5. The device of claim 4, wherein each recess comprises a ramp leading to each locking shoulder in the respective recess for guiding the corresponding snap-on hook onto its locking shoulder when the two half disk sections are locked together.

6. The device of claim 1, wherein said synthetic material of said half disk section disks is a thermoplastic material.

7. A device for securing a plurality of individual electrical conductors in a bundle to form a cable, comprising a synthetic material disk divided into two half disk sections having a common central axis, each half disk section having radially outwardly open recesses for receiving one of said individual electrical conductors in a respective recess and circumferentially extending flexible rim sections (5) having a radially inwardly directed biasing force for holding a respective conductor in its recess, each half disk section further comprising snap-on connector means for securing said half disk sections to each other and a bow-shaped shell portion centrally located in each half disk section relative to said common central axis, said bow-shaped shell portions reaching inwardly from opposite direction so as to extend approximately in parallel to each other for holding at least one electrical conductor between both shell portions of said two half disk sections when said two half disk sections are interlocked by said snap-on connector means, and wherein each of said shell portions has an axial extension projecting laterally and axially outwardly from an end face of its respective half disk section, and wherein each of said extensions has a radially outwardly reaching shoulder (7) at its free end for holding a strapping belt.

8. The device of claim 7, wherein said snap-on connector means comprise a tongue and a groove in each of said half disk sections, said tongue and groove being located with equal spacings from said central axis and next to a dividing plane between said two half disk sections so that the tongue of one half disk section can engage in the groove of the other half disk section and vice versa to form a snap-on connection between said two half disk sections.

9. The device of claim 8, further comprising means (12, 13) for locking said half disk sections against axial displacement relative to each other.

10. The device of claim 7, wherein said snap-on connector means comprise at least one locking shoulder and at least one elastically bendable snap-on hook in each of said half disk sections, said locking shoulder and said snap-on hook being located with equal spacings from said central axis and next to a dividing plane between said two half disk sections so that the snap-on hook of one half disk section can engage the locking shoulder of the other half disk section and vice versa to form a snap-on connection between said two half disk sections.

11. The device of claim 10, wherein each of said half disk sections comprise a recess with two of said locking shoulders in each recess, and two elastically bendable snap-on hooks arranged for engaging the respective locking shoulders to form said snap-on connection.

12. The device of claim 11, wherein each recess comprises a ramp leading to each locking shoulder in the respective recess for guiding the corresponding snap-on hook onto its locking shoulder when the two half disk sections are locked together.

13. The device of claim 11, further comprising an axially extending channel reaching to said recess for inserting a tool into said channel to dislodge said snap-on hooks when said half disk sections are to be disconnected from each other.

14. The device of claim 7, wherein said synthetic material of said half disk sections is a thermoplastic material.

* * * * *

UNITED STATES PATENT AND TRADEMARK OFFICE
CERTIFICATE OF CORRECTION

PATENT NO. : 5,243,138
DATED : September 7, 1993
INVENTOR(S) : Hans-Peter Guthke, Werner Piede, Uwe Soltow It is certified that error appears in the above-identified patent and that said Letters Patent is hereby corrected as shown below: Title page:

Item: [57] ABSTRACT, line 12, delete "as".

Claim 3, column 5, line 42, after "half" insert --disk--;
                    line 44, delete "the" (second occurrence).

Claim 6, column 5, line 57, delete "disks".

Claim 7, column 6, line 10, replace "direction" by
                    --directions--.

Signed and Sealed this

Fifteenth Day of March, 1994

Attest:

BRUCE LEHMAN

Attesting Officer     Commissioner of Patents and Trademarks